(No Model.)

J. M. BLOCKER.
Seed Separating Machine.

No. 234,946. Patented Nov. 30, 1880.

WITNESSES:
Jno. E. Gavin
Chas. M. Higgins

INVENTOR:
James M. Blocker
by S. W. Wallis
Atty.

UNITED STATES PATENT OFFICE.

JAMES M. BLOCKER, OF BROOKSTON, TEXAS.

SEED-SEPARATING MACHINE.

SPECIFICATION forming part of Letters Patent No. 234,946, dated November 30, 1880.

Application filed June 29, 1880. (No model.)

*To all whom it may concern:*

Be it known that I, JAMES M. BLOCKER, of Brookston, Lamar county, Texas, have invented certain new and useful Improvements in Seed-Separating Machines, of which the following is a specification.

My invention is more especially designed to grind the fruit of the osage-orange tree and separate the seed from the pulp, the seed being the only valued part, the pulp being inedible; but the machine may also be used for separating and recovering the seed of any similar pulpy fruit, whether edible or not.

In the machines heretofore made for separating and recovering osage-orange seed the pulp or fruit is ground with water in a tub having pegs projecting from its sides, in which a cylinder with projecting intermediate pegs revolves and tears or grinds the fruit, the ground fruit or pomace being removed therefrom by hand to a trough, where it is washed by the flow of water and the action of the hand, so as to separate the seed from the pulp, the seed falling through the perforated bottom of the trough into an under trough, where it accumulates, while the larger part of the pulp is thrown out of the upper trough by hand, or is carried away with the water.

My invention aims to provide a machine for this purpose in which the grinding and separating actions will be performed continuously and in a more automatic manner, dispensing with the work of the hand, requiring a less amount of water, and at the same time performing the grinding and separating actions in a more rapid and perfect manner.

Figure 1:
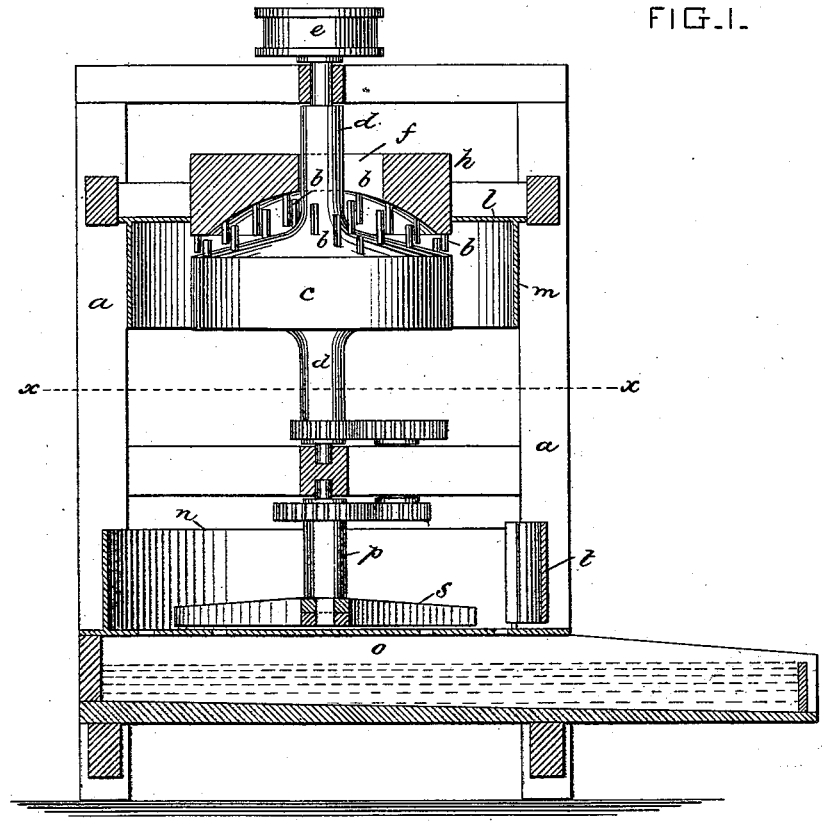
Figure 2:
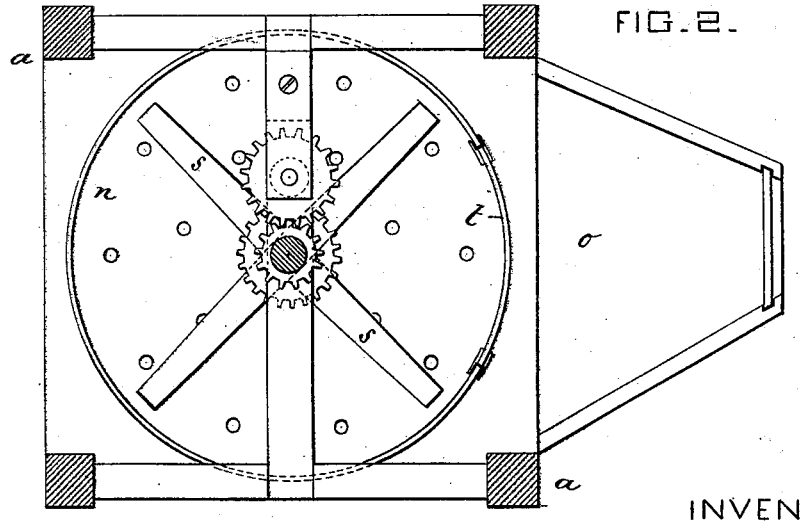

In the annexed drawings, Figure 1 presents a vertical sectional elevation of my improved machine. Fig. 2 is a sectional plan view on the line $x\ x$, Fig. 1.

The frame of the machine is indicated by $a\ a$, and is of upright rectangular form, and is preferably made of wood. The grinding portion of the machine is arranged in the top of the frame, and consists of a fixed disk, $h$, having its under side formed with a conical or concave recess, which is studded with a number of projecting pins or teeth, $b$. Below this fixed disk is arranged a rotating disk, $c$, having a conical or convex face to correspond with the recess of the upper disk, and also studded with projecting pins $b\ b$, which, when the disk revolves, mesh with the pins of the fixed disk, and thus produce an energetic tearing or grinding action upon any material introduced between the disks.

The teeth or pins at the center of the disk are larger and set wider apart than those at the outer portion, and they are set in a slightly spiral or screw direction upon the disks, so as to tend to work the ground material outward in a more positive manner.

The lower or revolving disk, $c$, is mounted on a spindle, $d$, whose lower end is supported in a bearing on the central cross-bar of the frame, while its upper part extends through a central opening in the fixed grinding-disk $h$, and is supported in a bearing in the top cross-bar of the frame, and is also terminated with a pulley, $e$, by which power is applied to the machine. An opening, $f$, is formed through the upper disk, $h$, on one side of the spindle, through which osage fruit or other material to be ground is inserted between the two disks, and the disks are separated the distance of about one inch, or sufficient to permit the easy passage of the ground fruit between them. Near the lower edge of the upper disk a ring, $l$, extends outward about four inches beyond the grinding-disks, and from its periphery a circular rim, $m$, extends downward to about the bottom of the lower disk. This rim serves to deflect and arrest the ground pulp as it is thrown outward centrifugally from the grinding-disks, and also acts to direct the ground pulp downward in an annular drip at a point beyond the range of the rotating disk $c$ and its driving-spindle. Below the rim $m$, near the bottom of the frame, is fixed a pan, $n$, which is somewhat larger than the rim, and which catches the ground pulp or pomace as it falls from the rim. The bottom of this pan is perforated with a number of holes, each about one-half inch in diameter, and it is placed over a trough, $o$, which extends some distance from the base of the machine. A spindle, $p$, in line with the main spindle $d$, extends into the pan, and is journaled at its lower end in the center of the pan, and provided with four or more radial stirring-arms, $s$, which revolve closely over the perforations in the bottom of the pan. This stirring-spindle is driven, preferably by gearing from the main spindle $d$, so as to revolve at about half the speed of the main spindle, as shown in Fig. 1.

The machine when set in motion operates as follows: The osage oranges or other material to be ground are fed through the opening of the upper disk between the two disks, together with a small quantity of water, which is preferably allowed to constantly trickle in a small stream into the feed-opening. The fruit is now rapidly ground or torn by the intermeshing teeth of the disk, the water assisting in the grinding and serving to keep the disks clean, and also assisting by its centrifugal force the travel of the fruit outward. The ground fruit and water are thrown centrifugally from the disks, and, striking the deflecting-rim $m$, fall downward in an annular drip into the pan $n$, from which the greater portion of the water passes into the underlying trough through the perforations of the pan, and a portion finds a regulated escape, together with the finer and lighter portions of the pulp, under the adjustable gate $t$, with which the pan is provided, and which may be raised more or less, as required. The stirring-arms $s$ catch the larger pieces of the pulp with their adhering seed and force the same through the perforations of the pan with a further tearing action, which effectually tends to further separate the seed, and the pulp and seed then drop into the trough $u$, in which the water accumulates to a good depth. The seed now gravitates to the bottom of the trough and there accumulates, while the pulp floats off with the slowly-moving current of water and is discharged at the end of the trough. When sufficient seed has accumulated in the trough it may be removed and dried, and is then fit for preservation.

It may be observed that by this machine the fruit is ground and the seed separated and accumulated and the pulp discharged in an automatic manner, and this is furthermore carried on in a rapid and continuous manner without requiring the action of the hand, and without such a waste of water as former methods have required, thus presenting several advantages in favor of my invention.

What I claim as my invention is—

1. In a seed-separating machine substantially such as described, the combination of a grinding device placed in the upper part of the machine, a perforated receiving-pan arranged below and receiving the ground material directly therefrom, and an accumulating-trough arranged under the said perforated pan, with a stirring device integral with the machine and operating simultaneously with the grinder to stir or agitate the ground material in the said pan and force it through the perforations thereof into the accumulating-trough below, whereby the grinding and separating are performed simultaneously and continuously in the same machine, substantially as herein set forth.

2. The combination, in a machine of substantially the kind described, of the grinding disks or cones $h\ c$, formed with intermeshing teeth on their approaching faces, the one disk revolving while the other remains stationary, with the annular deflecting-rim $m$, surrounding the disks laterally at a suitable distance from their centrifugally-discharging edges and depending below the same, substantially as and for the purpose herein set forth.

3. The combination of the fixed grinding-disk $h$ and rotary grinding-disk $c$, having intermeshing teeth on their approaching faces and a centrifugal discharge, with the deflecting-rim $m$, surrounding and depending therefrom, the underlying perforated receiving-pan $n$, rotary stirring-arms $s$, revolving therein, and accumulating-trough $o$, arranged and operating substantially as and for the purpose herein shown and described.

JAS. M. BLOCKER.

Witnesses:
J. I. MANN,
W. B. KAVANAUGH.